W. A. HARRIS.
LOW PRESSURE ALARM FOR PNEUMATIC TIRES.
APPLICATION FILED MAR. 5, 1921. RENEWED APR. 10, 1922.
1,417,168.
Patented May 23, 1922.
2 SHEETS—SHEET 1.
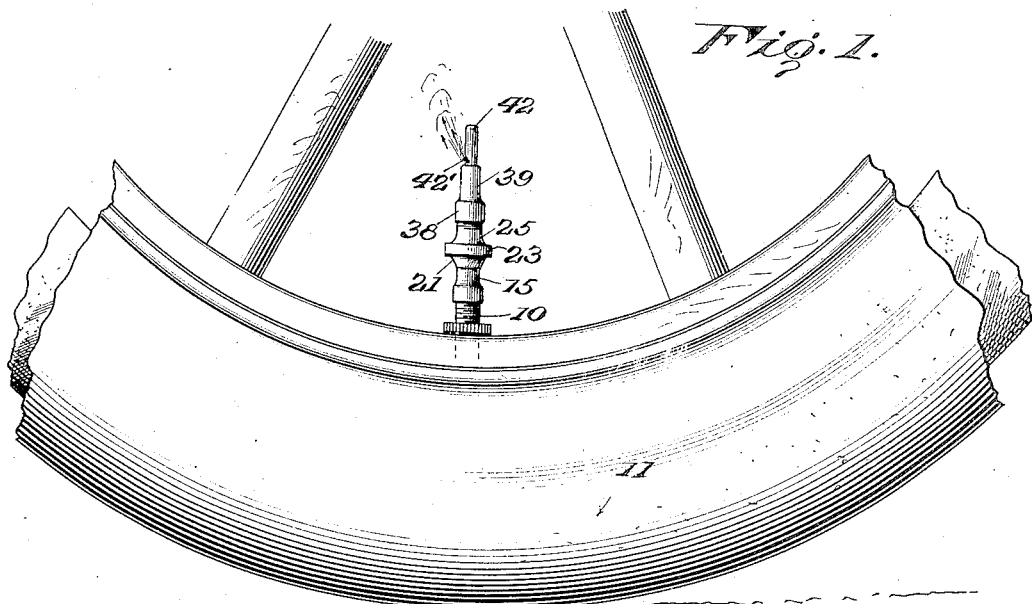
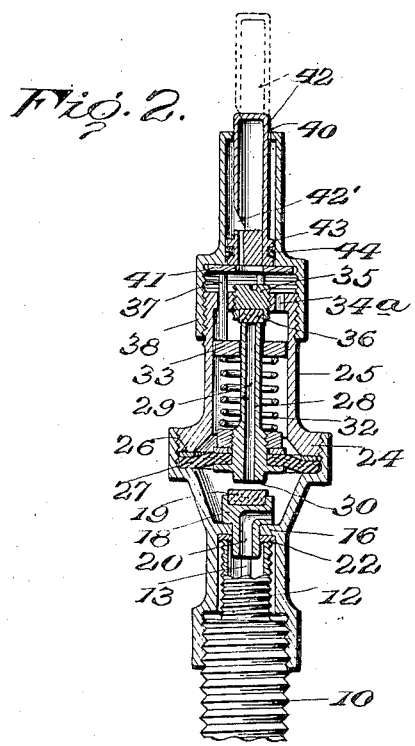
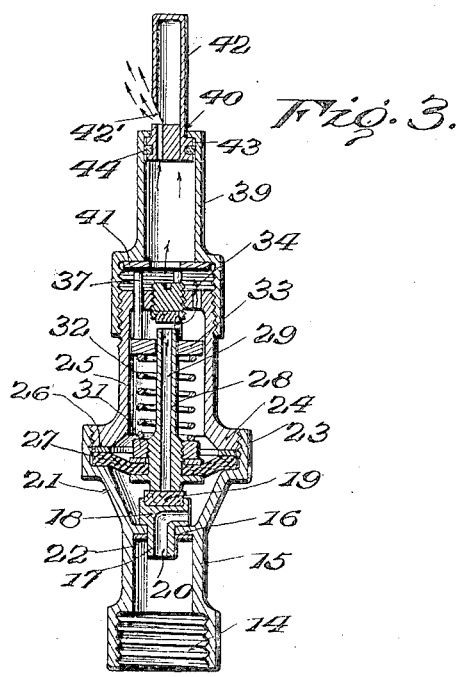
INVENTOR
W. A. Harris
BY
ATTORNEYS

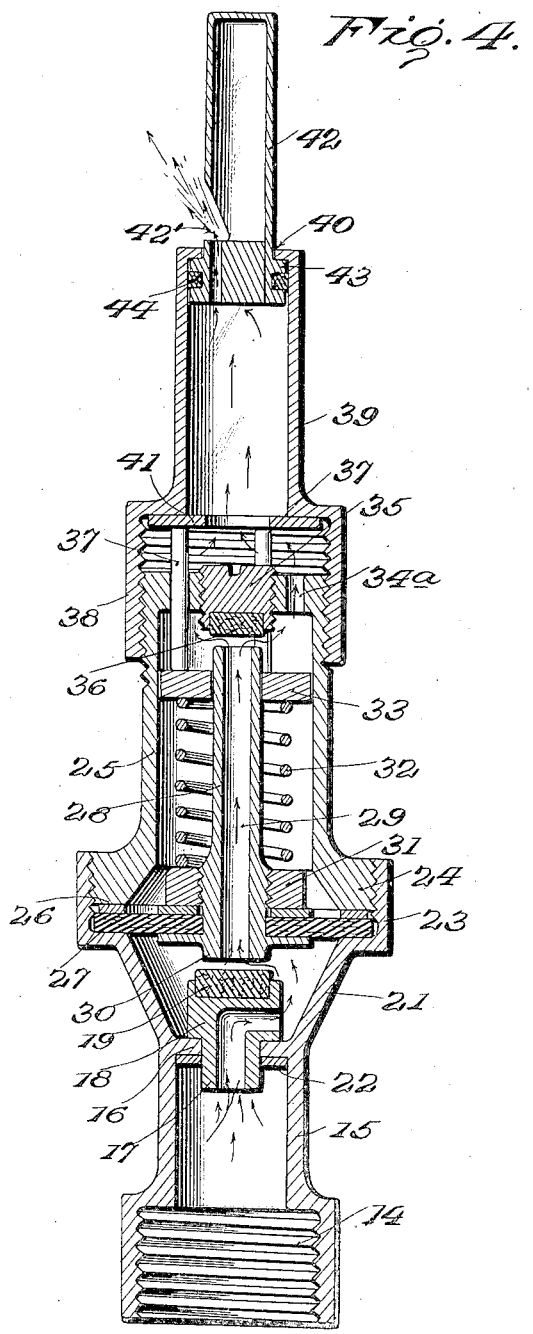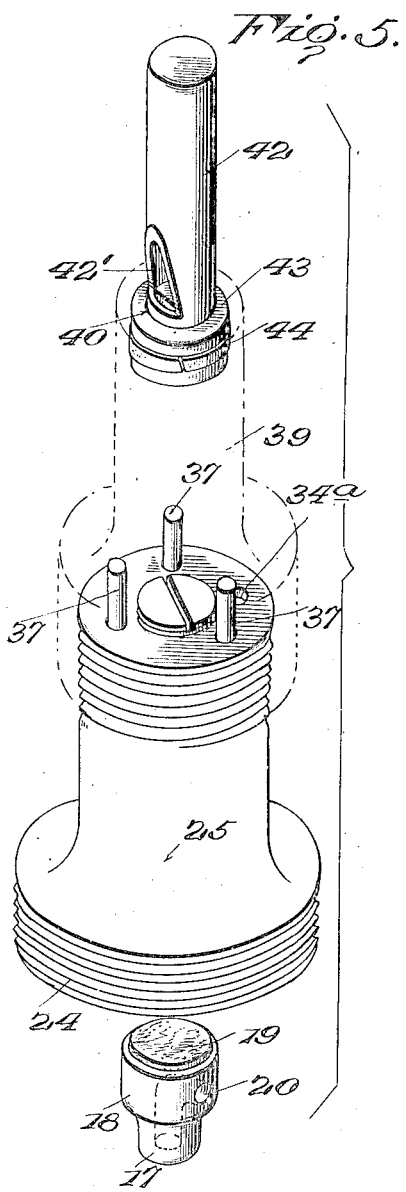

UNITED STATES PATENT OFFICE.

WILLIAM A. HARRIS, OF GREENVILLE, SOUTH CAROLINA, ASSIGNOR TO HARRIS ACCESSORY COMPANY, OF GREENVILLE, SOUTH CAROLINA, A CORPORATION OF SOUTH CAROLINA.

LOW-PRESSURE ALARM FOR PNEUMATIC TIRES.

1,417,168.     Specification of Letters Patent.     Patented May 23, 1922.

Application filed March 5, 1921, Serial No. 449,851. Renewed April 10, 1922. Serial No. 551,209.

*To all whom it may concern:*

Be it known that I, WILLIAM A. HARRIS, a citizen of the United States of America, and a resident of Greenville, in the county of Greenville and State of South Carolina, have made certain new and useful Improvements in Low-Pressure Alarms for Pneumatic Tires, of which the following is a specification.

My present invention relates generally to low pressure alarms for the pneumatic tires of automobiles and other motor cars, my primary object being the provision of an air actuated signal member of both an audible and a visible nature, together with means whereby to actuate the same in such manner as to expose the signal member to view at the same time a signal is sounded and in this way serve to notify the operator even should the latter fail to hear the audible signal.

A still further object is the provision of an alarm of the above nature in which the controlling means are so constructed and arranged as to permit of ready adjustment for different pressures upon the outside, without requiring dismantling of any of the parts or access to the interior thereof.

In providing a device designed to carry out the above objects in a practical, efficient manner, I propose a low pressure alarm in which the signal member is in the nature of a whistle, normally housed and protected from external influences such as snow, ice, dirt, dust and the like, and which is thus free for ready movement to an exposed position under effect of air pressure which also sounds the whistle. The construction is such that in its normal housed position, the signal member is held both by friction and by centrifugal action, and in its exposed effective position it is held by friction against centrifugal force.

It is obvious that for the purpose of sounding the audible signal a certain amount of air pressure must be expended, this air pressure proceeding from the tire through a channel which in the normal inactive or set position of the parts, is closed, and which is again closed after the expenditure of sufficient air pressure to effectively sound an alarm so that but a limited amount of air pressure can escape, and deflation of the tire by continued sounding of the alarm is avoided. This action I purpose to bring about by the use of simple effective movable parts, whose movement in one direction is controlled by air pressure and whose movement in the opposite direction is controlled by a spring, and I associate with these parts a casing, one section of which forms a housing for the signal member and has a threaded adjustment, and means whereby upon adjustment the effective pressure of the spring is regulated.

In the accompanying drawings which illustrate my present invention and form a part of this specification:—

Figure 1 is a fragmentary side view illustrating the practical application of my invention;

Figure 2 is a vertical sectional view through my improved low pressure alarm showing the parts in the normal inactive set position;

Figure 3 is a similar view showing the parts in active position with the alarm exposed and with the alarm actuating pressure cut off;

Figure 4 is an enlarged central vertical sectional view with the parts in position during sounding of an alarm, and, Figure 5 is a perspective view of certain of the parts in detached relation.

Referring now to these figures, I have shown particularly in Figs. 1 and 2, the valve tube 10 of a pneumatic tire 11, the usual upper reduced cap receiving portion 12 of which tube I have shown broken away and in section in Fig. 2 in order to expose the valve stem 13 to view.

The valve tube 10 is in my improved low pressure alarm received within the lower enlarged and threaded portion 14 of a holder 15 of cylindrical form, provided adjacent its upper end with a centrally apertured transverse wall 16 receiving in a driving fit the lower reduced valve stem engaging portion 17 of a valve seat supporting block 18, having a rubber or other soft disk 19 upon its upper end above the transverse wall 16.

This block 18 has an angular bore 20 whose upper end opens into the flared upper portion 21 of the holder 15 at one side of the disk 19.

The transverse wall 16 also supports a lead or other soft washer 22 around the lower reduced portion 17 of the seat block 18 to receive the upper end of the valve tube 10 in air tight relation.

At the upper end of its flared upper portion 21, the holder 15 has an upstanding annular internally threaded flange 23, which receives the lower flared or enlarged end 24 of the barrel or casing 25, whose said lower end screws into the flange 23 against a washer 26 in turn bearing upon the peripheral portion of a flexible diaphragm 27 so as to thus clamp the latter around its edge within the upper flared portion of the holder 15.

To the center of the diaphragm 27 is rigidly connected the lower end of an upright hollow stem 28, the lower end of the bore 29 of which opens into the space below the diaphragm 27 when, as in the normal position of the parts the depending lower end 30 of the stem is spaced from the disk 19, as shown in Figure 2. Above the diaphragm 27 the stem 28 is threaded to receive a nut 31 and bearing upon this nut is the lower end of a coil spring 32, which upstands within the barrel or casing 25 around the stem, and the upper end of which spring bears against a disk 33 slidable within the barrel or casing, and centrally apertured to receive therethrough the upper end of the stem 28 and form a guide therefor.

The upper end of the barrel or casing 25 has a transverse wall 34 provided with a central opening and with threads around the opening to receive an adjustable seat block 35 in whose lower end is seated a rubber or other soft disk 36 for cooperation with the upper end of the stem 28. This upper wall 34 of the barrel or casing 25 also has a series of openings therethrough, one of which indicated at 36, as seen particularly in Figs. 4 and 5, serves as an air passage in certain positions of the parts, and the other openings of which receive a series of adjusting pins 37 whose lower inner ends bear against the upper surface of the spring together with adjusting disk 33.

Adjacent to its upper wall 34, the barrel or casing 25 is externally threaded to receive the lower enlarged and internally threaded portion 38 of a cap having a vertical cylindrical body 39 provided with a reduced opening 40 at its upper end. This cap has a shoulder between its cylinder body 39 and its enlarged lower portion 38 upon which is seated a washer 41 engaging the upper outer ends of the pins 37, so that rotative adjustment of the cap on the barrel or casing 25 serves to adjust the tension of the spring 32, increasing or decreasing its tension, depending upon the direction of such rotation.

In the cylindrical body 39 of the cap the signal member is normally housed, this signal member being in the form of a whistle tube 42 having a side opening 42' adjacent its lower end, tube 42 slidably interfitting the aperture 40 of the upper end of the cylindrical body 39 of the cap and having a lower enlarged end 43 which slidably interfits the said body and is provided with split ring 44 frictionally engaging the inner surface of the cylindrical body with sufficient tension to cooperate with centrifugal force in holding the signal member normally in the inner housed position of Figure 1, and overcome the effect of centrifugal force in the support of the signal member in the exposed position shown in Figs. 3 and 4.

In operation, and in the initial application of my improved low pressure alarm to the valve tube 10, the usual cap of the valve tube is removed and the holder 15 screwed on to the valve tube in lieu of the cap, the pressure on the tire then finding its way into the space within the holder below the diaphragm 27 so as to act against the latter and shift the controlling stem 28 upwardly until its upper end seats against the upper adjustable seat 36. In this way air pressure passes upwardly into the bore 29 of stem 28, but is prevented from passage out of the upper end of the bore, and in this position of the parts of course a tire pressure is present in an amount exceeding the pressure of the spring 32. During the time the parts remain in this position, the signal member is held in housed position within the cap 39 as shown in Figure 2. When pressure within the tire falls below the point required to hold the stem 28 in upper position, spring 32 forces the stem 28 downwardly, thus shifting the upper end of the stem free of the upper seat disk 36. Pressure from the tire then finds its way through the bore 29 of the stem and upwardly through the opening 34 of the upper wall of the barrel or casing 25 and from thence into the cap 39 and against the lower end of the signal member. The signal member is thus shifted upwardly to the position shown in Figures 3 and 4, and the audible signal or whistle is sounded as soon as the side opening 42' of the whistle tube 42 projects above the upper end of the cap 29. This audible signal continues to operate as long as pressure escapes through the whistle, and this pressure continues to escape until spring 32 expands sufficient to force the lower end of the tube 28 into engagement with the lower seat disk 19, whereupon further escape of pressure from the tire is prevented. But, as before stated, the signal member or tube 42 continues to upstand in exposed position so as to constitute a visible signal by virtue of the friction between the split ring 40 and the inner surface of the cap 39. This frictional engagement overcomes centrifugal force in the rotation of the wheel, and in case the vehicle is stationary and the operator is away from the same when the audible signal is sounded, it is obvious he will be notified of the actuation of the signal and the fall of pressure within the tire by the fact that the signal member is exposed.

It is obvious that by rotating the cap 39 in one direction or the other, the effected pressure of spring 32 may be regulated to permit of more or less fall of pressure in a tire before the signal is sounded. For instance in a tire whose pressure is desired to be maintained at 70 pounds, the cap 39 may be adjusted so as to bring about actuation of the parts when pressure has dropped 10 pounds, or by different adjustment of parts may be caused to be actuated by the drop of 5 pounds.

In so far as the time lapsing between the initial sounding of the whistle and the shut off of air pressure at the lower end of the stem 28, it is obvious that there will be a material difference between the tires of different sizes and that in connection with a tire of any particular size this interval can be controlled by adjusting the upper seat 35, that is, screwing the same in or out to more or less limit the movement or stroke of the stem 28.

I claim:

1. In a low pressure alarm, a casing, a spring actuated pressure controlled stem having an air conduit, means for adjusting the actuating spring of the said stem, including a cap threaded on the casing and adjustable with respect thereto, a pressure actuated whistle tube slidably interfitting and normally housed in the cap and shiftable to exposed position when the signal is sounded, means carried by said tube and engaging the cap to prevent accidental displacement of the tube in the housed and exposed positions, and spaced closure members against which the opposite ends of the said stem are shiftable to closed positions and between which the stem forms a conduit for the passage of pressure to the signal member.

2. In a low pressure alarm, a casing, a spring actuated pressure controlled tube therein having spaced seats against which its opposite ends are adapted to close, a threaded plug in connection with which one of said seats is adjustable to control the stroke of said tube, a cap threaded on the casing and removable therefrom to expose the adjustable seat, means engaged and controlled by the cap for adjusting the effective pressure of the actuating spring of said tube, and a piston like signal member slidably interfitting a portion of the cap and normally housed and inactive therein.

3. In a low pressure alarm, a valve tube engaging holder, a seat block therein, a casing detachably connected to the holder, a diaphragm clamped between the casing and the holder, a hollow stem shiftable in the casing, said stem being connected adjacent to one end to the diaphragm and movable at said end into and out of engagement with the seat block of the holder, a spring within the casing having connection with the said stem at one end, a seat block carried by the casing and into and out of engagement with which the opposite end of the stem is shiftable, a cap adjustable on the casing and having connection with the opposite end of the spring whereby to regulate the tension of the latter, and a whistle tube slidably mounted in the cap and shiftable within and from the same under the control of air pressure, said whistle tube forming a visible signal in its outer position and having means frictionally engaging the cap to prevent accidental displacement of the said whistle tube in its inner and outer positions.

4. In a low pressure alarm, a casing, spaced seat blocks, one of which is mounted within one end of the casing and adjustable with respect thereto, a diaphragm between the seat blocks, a hollow stem connected adjacent to one end of the diaphragm and movable into engagement at its opposite ends with the said seat blocks to close the opposite ends of its hollow, a spring within the casing having one end in engagement with the stem, said end of the casing in which the adjustable seat block is mounted having a series of openings around the seat block, pins extending through certain of said openings and having their inner ends engaging the oposite end of the spring, a cap threaded on the casing, and a bodily shiftable signal member movable into and out of the cap, having its inner end exposed to the action of air pressure and having means frictionally engaging the cap for the support of the signal member in its active and inactive positions.

5. In a low pressure alarm, a casing, spaced seat blocks, one of which is mounted within one end of the casing and adjustable with respect thereto, a diaphragm between the seat blocks, a hollow stem connected adjacent to one end of the diaphragm and movable into engagement at its opposite ends with the said seat blocks to close the opposite ends of its hollow, a spring within the casing having one end in engagement with the stem, said end of the casing in which the adjustable seat block is mounted having a series of openings around the seat block, pins extending through certain of said openings and having their inner ends engaging the opposite end of the spring, a cap threaded on the casing, said cap having a cylindrical portion exposed at its inner end to the adjacent end of the casing and provided with a reduced opening at its outer end, and a whistle tube slidably interfitting the last mentioned opening, having an enlarged inner end within the cylindrical portion of the cap and provided with a split ring frictionally engaging the inner surface of the said cylindrical portion of the cap and arranged to support the whistle tube in its inner and outer positions against accidental displacement.

WILLIAM A. HARRIS.